Jan. 4, 1949.  R. G. REYNOLDSON  2,458,424
AUTOMATIC SPEED CONTROL FOR
INTERNAL-COMBUSTION ENGINES
Filed April 24, 1947  2 Sheets-Sheet 2
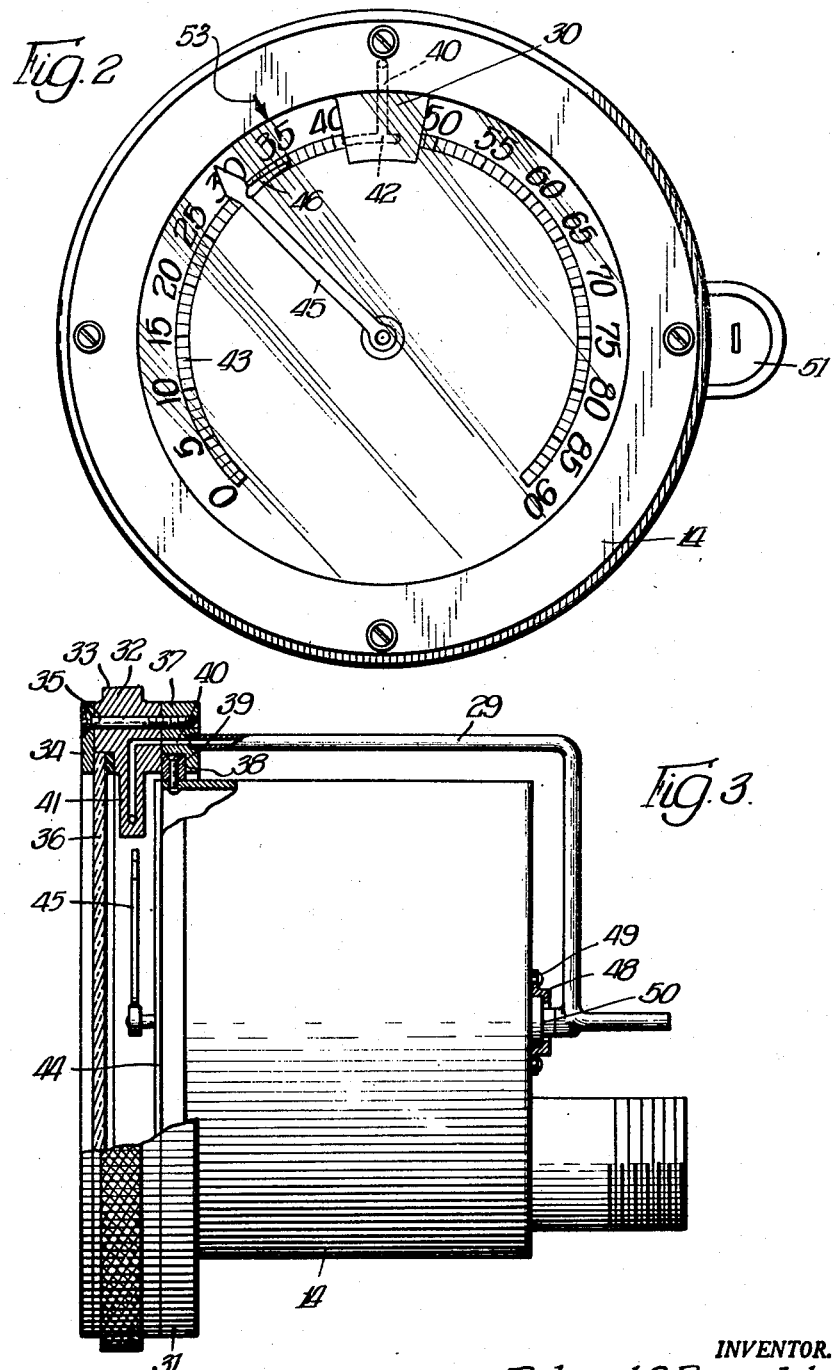
INVENTOR.
Roland G. Reynoldson,
BY
Cromwell, Greist + Warden
Attys.

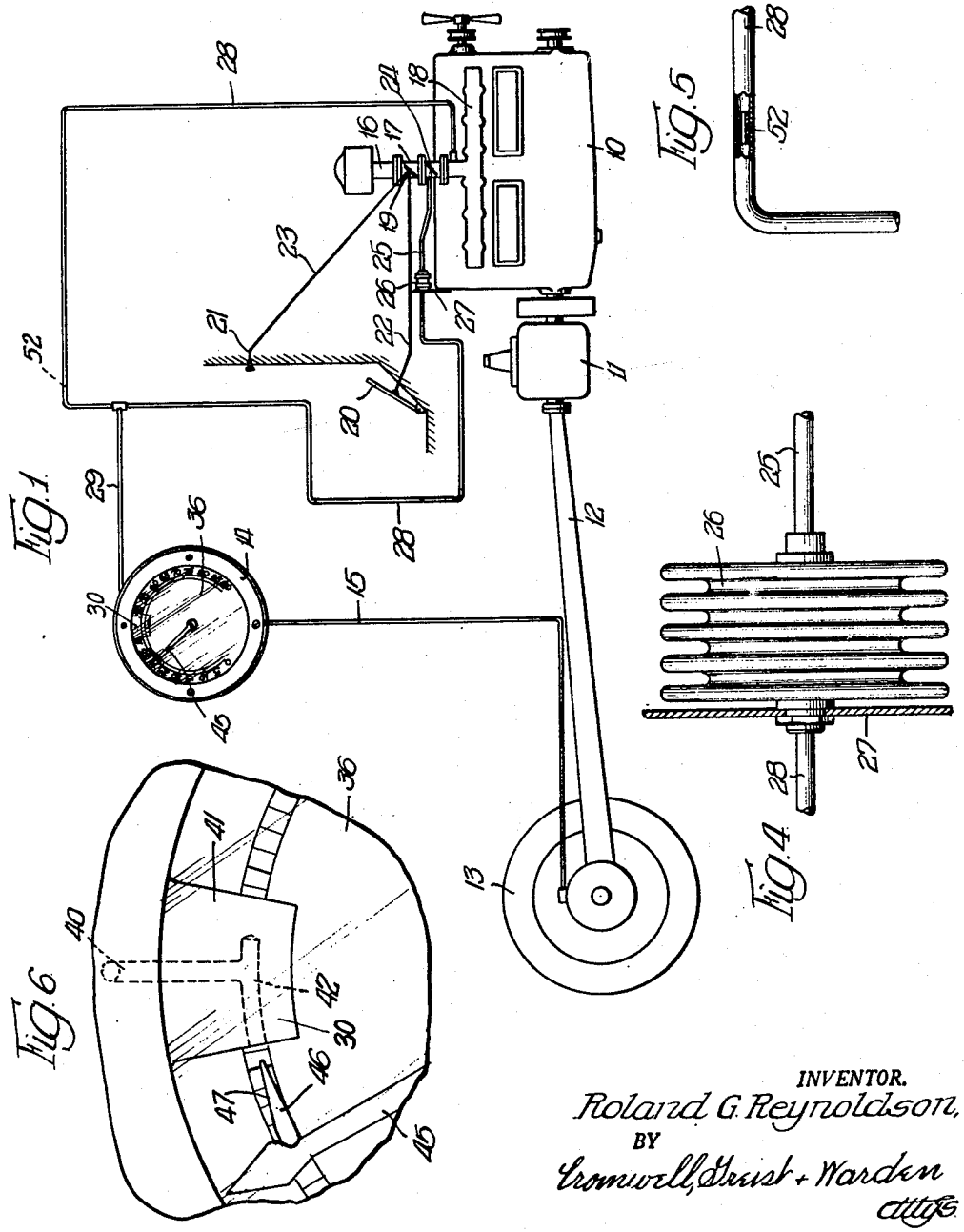

Patented Jan. 4, 1949

2,458,424

UNITED STATES PATENT OFFICE 2,458,424

AUTOMATIC SPEED CONTROL FOR INTERNAL-COMBUSTION ENGINES

Roland G. Reynoldson, Madison, Wis.

Application April 24, 1947, Serial No. 743,688

6 Claims. (Cl. 180—82.1)

1

This invention relates to mechanism for controlling the speed of an internal combustion engine of a self-propelled vehicle to prevent overspeeding of the vehicle.

An object of the invention is to provide means for controlling the speed of an internal combustion engine which may be set to take over the control of the engine when the speed of the vehicle reaches a predetermined amount.

Another object of the invention is to provide an automatic control system for self-propelled vehicles having a speedometer or similar mechanism and an engine provided with a fuel passage and a fuel controlling valve therein which system comprises an auxiliary valve in the fuel passage and mechanism for operating the auxiliary valve which is adapted to be manually set to automatically operate the valve at a predetermined speedometer reading.

A further object of the invention is to provide an auxiliary control valve for the gas intake of an internal combustion engine in a motor vehicle and vacuum operated means for actuating the auxiliary control valve which cooperates with means on the speed indicating device of the vehicle whereby the latter may be set to actuate the auxiliary valve upon the vehicle reaching a predetermined speed.

Another object of the invention is to provide an auxiliary control valve for the gas intake of an internal combustion engine in a motor vehicle and pressure operated mechanism for actuating the control valve which cooperates with means on a speed responsive device on the vehicle whereby the latter may be set to actuate the auxiliary valve upon the vehicle reaching a predetermined speed.

Another object of my invention is to provide a speed governing mechanism in an automobile which cooperates with a speed responsive device on the automobile and the motive power intake of the automobile driving motor to control the driving motor so that the speed of the automobile will not exceed a predetermined speed in accordance with the speed for which the control mechanism is set relative to the speed responsive device.

Another object of the invention is to provide a manual arrangement whereby the fuel control of an internal combustion engine is of multiple character that is responsive to different speeds and the manual selection of a predetermined speed can be imposed upon the control system for the automatic operation thereof.

Another object of the invention is to associate

2 with the manual settable element of a speed governing mechanism in an automobile a lock arrangement whereby the settable element may be locked at the desired maximum vehicle speed to prevent speeding of the vehicle beyond the selected speed.

Another object of the invention is to provide an automatic speed governing mechanism in an automobile which operates smoothly and eliminates any appreciable hunting action regardless of whether the vehicle is traveling on the level or up or down a grade.

These and other objects and advantages will be apparent from a description of the preferred form of the invention which is shown by way of illustration in the accompanying drawings, wherein:

Fig. 1 is a schematic view of a speed governing mechanism embodying the principles of the invention applied to a motor vehicle;

Fig. 2 is an elevation of a speedometer head for use with the governing mechanism;

Fig. 3 is a side elevation of the speedometer head partly in section;

Fig. 4 is a detail view of the auxiliary valve operating mechanism;

Fig. 5 is a detail view of a portion of the vacuum line with parts in section; and Fig. 6 is a detail view partly in section of the movable bleeder port in the vacuum line and the cooperating metering pin on the speedometer indicating arm.

There is illustrated in Fig. 1 a mechanism which embodies the principles of my invention applied to a motor vehicle having a conventional internal combustion engine 10, a transmission 11, a drive shaft 12 and a rear wheel 13. A speedometer head 14 is connected by a cable drive 15 with the rear wheel 13 or is driven by any suitable means to indicate the speed of the vehicle. The engine 10 is provided with the usual carburetor 16 having a fuel line or passage 17 leading to the intake manifold 18. The fuel line 17 is provided with a butterfly control valve 19 which is adapted to be operated by pressure on the foot pedal or accelerator 20 or by means of a hand throttle 21 through conventional connecting rods or link members 22 and 23.

The fuel line 17 is also provided with an auxiliary control valve 24 positioned between the conventional butterfly valve 19 and the intake manifold 18. An operating rod 25 extends from the control valve 24 to a vacuum operated bellows member 26 (Figs. 1 and 4) which is supported from the engine 10 by a bracket 27. A vacuum line 28 connects the bellows 26 with the intake manifold 18. The vacuum line 28 is provided with a branch or connecting line 29 which extends to the speedometer head 14 and terminates in a bleeder port indicated generally at 30 (Fig. 2).

The speedometer head 14 (Figs. 2 and 3) is provided with a ring assembly 31 having a central ring member 32 which is knurled on its outer periphery 33. A plate 34 is secured to the front of the ring 32 by screws 35 and retains a glass or other transparent cover member 36 thereon. The screws 35 also secure the central ring member 32 to a rotatable supporting ring member 37. Ring member 37 is provided with an inner guide groove 38 for receiving a guide ring 39 which is secured to the periphery of the speedometer head casing adjacent the front edge thereof whereby the ring assembly 31 is mounted for rotation on the speedometer head.

The vacuum connecting line 29 is connected with an angular passageway 40 in the ring members 32 and 37. The passageway 40 extends radially inwardly into an inwardly projecting member 41 on the ring 32 which constitutes a portion of the bleeder port 30. A lateral passageway or recess 42 extends from the passageway 40 and provides an opening in the side face of member 41.

The speedometer 14 is provided with a conventional mileage indicating scale 43 on the face 44 of the head and an indicating arm 45 which rotates about the central axis of the head. A metering pin 46 (Figs. 2 and 6) is provided adjacent the end of the indicator arm 45 which cooperates with the open end of the recess 42 in the member 41 of the ring 32 and when moved into the end of the recess 42 closes the port 30. As shown more particularly in Fig. 6, the end of the metering pin 46 is tapered at 47 so that as it moves into the recess 42 the port 30 is gradually closed rather than abruptly closed. The ring 32 may be rotated to bring the port 30 to any desired position on the face of the head 14 whereby it may be closed at any desired speed.

The vacuum connecting line 29 is provided with a support at the rear of the head 14 as shown in Fig. 3. The support consists of a socket or flanged retaining plate 48 secured to the head 14 by rivets 49 and a headed pin 50 secured to the line 29. The members 48 and 50 are aligned with the longitudinal axis of the head 14 so that the mechanism may rotate readily around the head 14. A lock member 51 may be provided where desired on the periphery of the head 14 to lock the ring assembly 31 in any desired position.

The vacuum line 28 is provided with a constriction at a point such as 52 (Fig. 5), the constriction being the same size as the port 30 so that the operation of the vacuum line, as the port 30 is opened or closed, will be uniform and gradual, proportional to the movement of the arm 45.

In operation, the control mechanism is set or adjusted by rotating the ring assembly 31 to position the bleeder port 30 so that it will be closed at the desired speed on the speedometer scale 43 which may be indicated, for example, by an arrow 53 on the ring member 34. (Fig. 2). When the speed of the vehicle causes the speedometer arm 45 to move the pin 46 into the port 30, the vacuum line 28 is closed and bellows member 26 operates the auxiliary valve 24 to take over control of the feed of the fuel. The closing of the port 30 is gradual and the operation of the valve 24 is also gradual so that there is no abrupt change in the fuel feed. The power of the engine is reduced until the speed of the vehicle causes the speedometer arm 45 to withdraw pin 46 from the port 30 whereupon control of the fuel feed passes to the operator controlled valve 19.

An alternative construction may be provided for actuating the auxiliary control valve by substituting air pressure for the vacuum illustrated. The line 28 may be disconnected from the intake manifold 18 and connected to a conventional air compressor which may be driven through gears or other appropriate driving mechanism connecting it with the motor. With this arrangement the vacuum operated bellows 26 illustrated for moving auxiliary valve 24 would be replaced by a suitable pressure operated means for moving the auxiliary valve. The control mechanism would operate otherwise in the same manner as in the illustrated construction.

While specific details of construction have been referred to in illustrating the principles of the invention, it will be understood that other details of construction may be resorted to within the spirit of the invention.

I claim:

1. In an automobile, the combination with a throttle controlled engine and a vehicle operated speed indicator, of means for controlling the speed of said engine when the speed of the automobile reaches a predetermined number of miles per hour comprising an auxiliary speed control valve for said engine which is independent of the throttle control for said engine, pressure transmitting means for controlling the operation of said auxiliary speed control valve, and means including a settable valve and a combination indicator arm and valve control member on said speed indicator for cooperating with said pressure transmitting means to operate said auxiliary speed control valve.

2. A speed control device for a vehicle which is driven by an internal combustion engine having a throttle controlled fuel feed valve, said control device comprising a separate independently operated fuel feed valve, pressure controlled means for operating said separate valve, vehicle speed indicator mechanism having a movable indicator element, said pressure controlled means including a movable actuator valve having a bleeder port and cooperating means on said movable indicator element for opening and closing said bleeder port to operate said valve, whereby said movable actuator valve may be set in the path of movement of said indicator element to operate said independent fuel feed valve when said indicator element reaches a predetermined point in its movement corresponding to a predetermined speed of said vehicle.

3. A speed limiting control for motor vehicles and the like including a fuel control valve arranged intermediate the normal throttle valve and intake manifold of the engine for controlling the passage of fuel to the intake manifold, a rod for operating said control valve, a pressure transmitting line having a bleeder port therein, pressure responsive means connected in said line for moving said rod when said bleeder port is restricted, a vehicle speed indicator mechanism having a movable indicator element, and means on said movable element for restricting said bleeder opening, whereby said bleeder opening may be positioned in the path of movement of said means so that said control valve will be operated when the vehicle reaches a predetermined vehicle speed.

4. A speed limiting control for motor vehicles and the like including an auxiliary fuel control valve arranged intermediate the normal throttle valve and intake manifold of the engine for controlling the passage of fuel to the intake manifold, a rod for operating said control valve, a vacuum line having a bleeder port therein, means connected to said vacuum line for moving said rod when said bleeder port is restricted, a vehicle speed indicator mechanism having a movable arm, and a tapered pin on said arm for movement into said bleeder port to restrict the same, whereby said bleeder port may be positioned in the path of movement of said arm so that said control valve will be operated when the vehicle reaches a predetermined vehicle speed.

5. A speed control device for a vehicle which is driven by an internal combustion engine having a throttle controlled fuel feed valve, said control device comprising a separate independently operated fuel feed valve, a vacuum line, a vacuum operated bellows member, a rod connecting said bellows with said independently operated fuel feed valve for operating said valve, vehicle speed indicator mechanism having a movable indicator member, a movable bleeder port in said vacuum line, said bleeder port being mounted on said speed indicator mechanism, and projecting means on said movable indicator member for closing said bleeder port whereby said movable bleeder port may be set in the path of movement of said indicator member to operate said independent fuel feed valve when said indicator member reaches a predetermined point in its movement corresponding to a predetermined speed of said vehicle.

6. A speed limiting control for motor vehicles comprising an auxiliary feed control valve arranged intermediate the normal throttle valve and intake manifold of the engine for controlling the passage of fuel to the intake manifold, a pressure responsive device for operating said auxiliary valve, a pressure transmitting line for operating said device, a bleeder port in said line, a vehicle speedometer having a movable indicator arm, said bleeder port being mounted for adjustable positioning in the path of said indicator arm, a tapered member on said indicator arm for constricting said bleeder port when said arm has moved the same into said bleeder port, and a constriction in said line of the same size as said bleeder port whereby said auxiliary valve will be operated at a predetermined speed of the vehicle depending upon the positioning of said bleeder port.

ROLAND G. REYNOLDSON.

REFERENCES CITED

The following references are of record in the file of this patent:

UNITED STATES PATENTS

| Number | Name | Date |
|---|---|---|
| 1,584,268 | Alexander | May 11, 1926 |
| 2,169,268 | McCullough | Aug. 15, 1939 |
| 2,253,875 | Vatter | Aug. 26, 1941 |
| 2,332,627 | Erbguth | Oct. 26, 1943 |